July 19, 1949.  T. H. THOMPSON  2,476,516
PITCH CONTROL MECHANISM FOR HELICOPTER ROTORS
Filed Sept. 27, 1944  5 Sheets-Sheet 1

INVENTOR
TOM H. THOMPSON
BY
Howson and Howson
ATTORNEYS

July 19, 1949.　　　　T. H. THOMPSON　　　　2,476,516
PITCH CONTROL MECHANISM FOR HELICOPTER ROTORS
Filed Sept. 27, 1944　　　　　　　　　　5 Sheets-Sheet 5
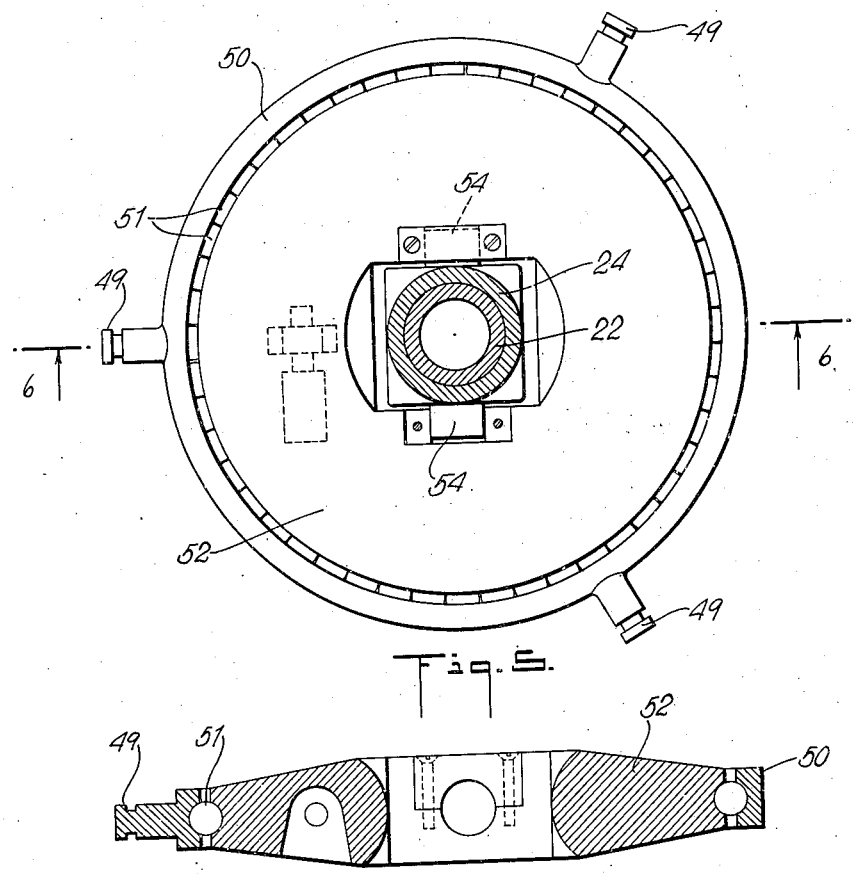
Fig. 5.
Fig. 6.
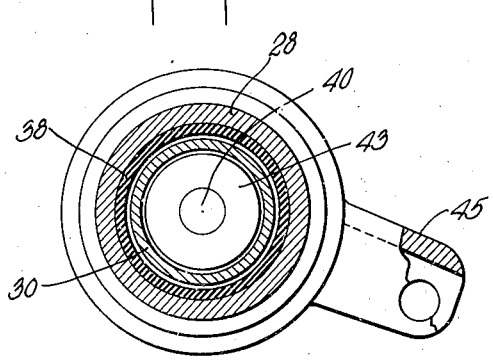
Fig. 7.
INVENTOR
TOM H. THOMPSON
BY
Howson and Howson
ATTORNEYS Patented July 19, 1949

2,476,516

UNITED STATES PATENT OFFICE 2,476,516

PITCH CONTROL MECHANISM FOR HELICOPTER ROTORS

Tom H. Thompson, Mamaroneck, N. Y., assignor to Thompson-Wade Corporation, Detroit, Mich., a corporation of Michigan Application September 27, 1944, Serial No. 556,033

6 Claims. (Cl. 170—160.25)

This invention relates to helicopters and it is an object of this invention to provide improved operating and control means for the helicopter rotors. It is also an object of this invention to provide an improved arrangement of the rotors.

In the drawings in which is illustrated a preferred embodiment of this invention:

Fig. 2A is a fragmentary view of the rudder control;

Fig. 2B is a fragmentary view of the means controlling the extent of the cyclic variation of the rotor blades;

Fig. 2C is a view in elevation of the governing means for maintaining the rotor blades positioned for a predetermined speed of rotation;

Fig. 5 is a partial horizontal sectional view taken as on line 5—5 of Fig. 4, various connections being omitted to show the disk and ring more clearly;

Fig. 6 is a vertical sectional view of the disk and ring taken as on line 6—6 of Fig. 5; and Fig. 7 is a partial vertical sectional view taken as on line 7—7 of Fig. 4.

Figure 1:
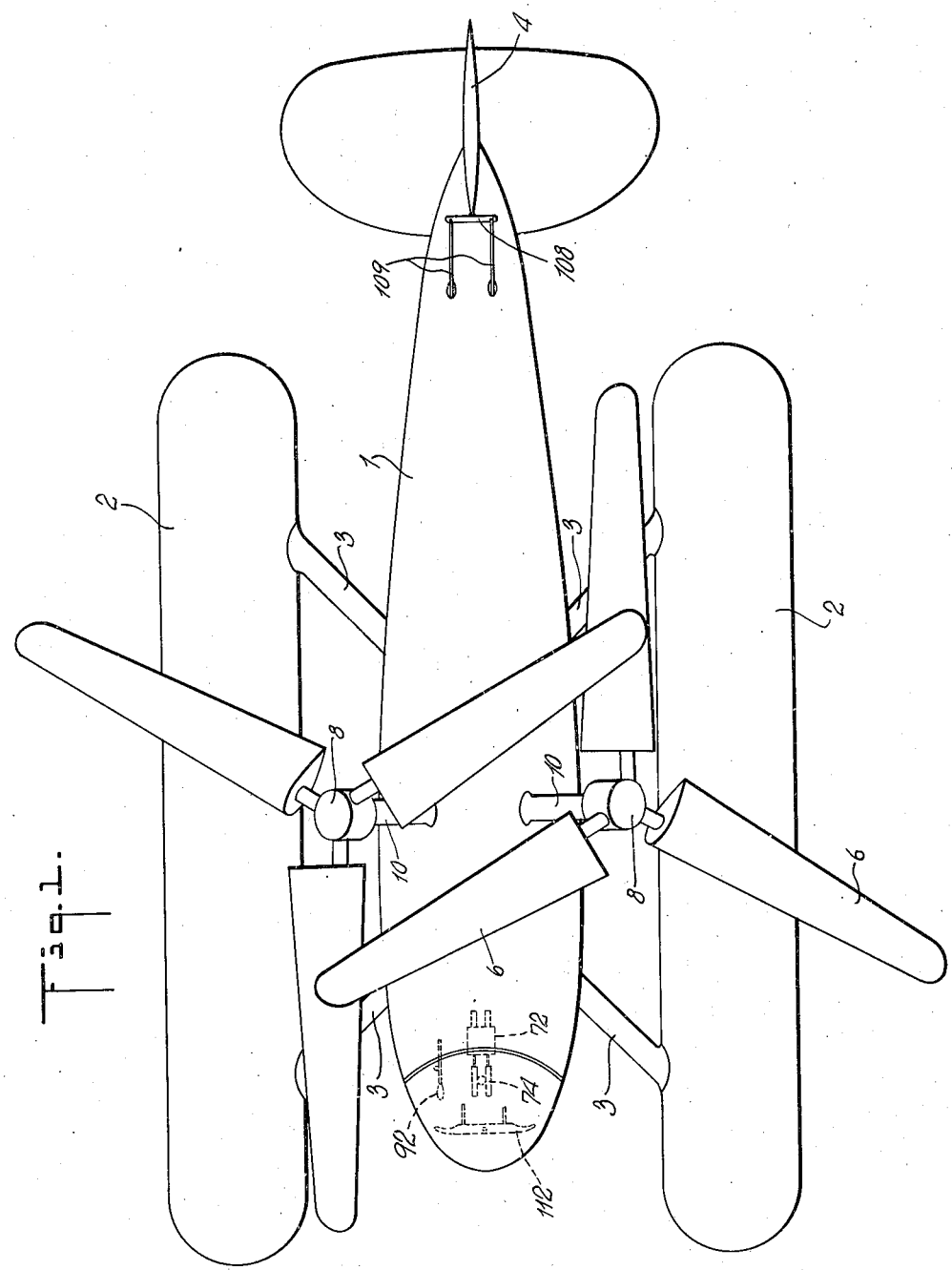
Fig. 1 is a diagrammatic plan view of a helicopter in accordance with this invention.
Figure 2:
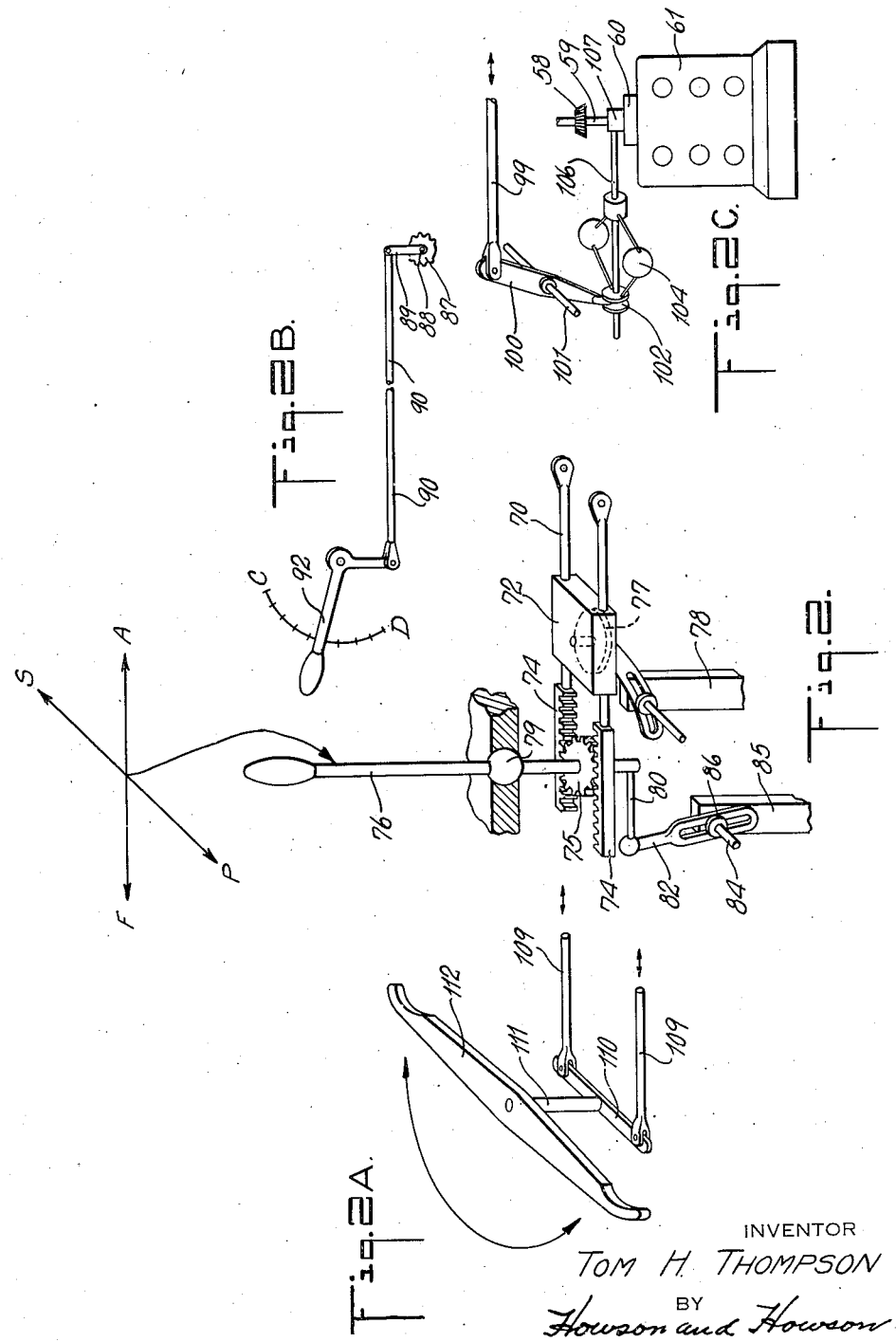
Fig. 2 is a fragmentary view in elevation of the means for controlling the cyclic variation of the rotor blades.
Figure 3:
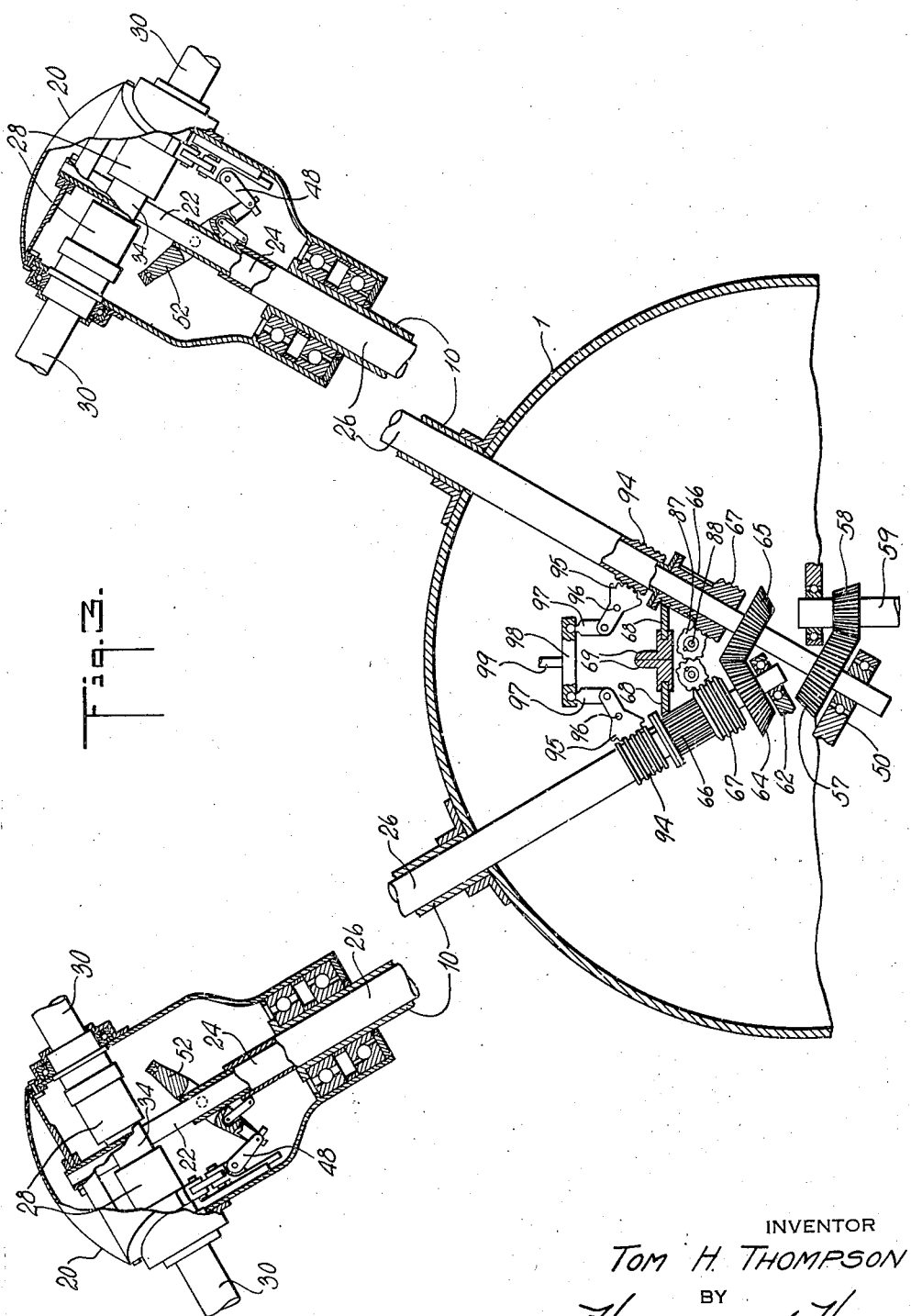
Fig. 3 is a broken partial view in vertical section of the support, operating and control means for the rotors as viewed from the front of a helicopter in accordance with this invention.
Figure 4:
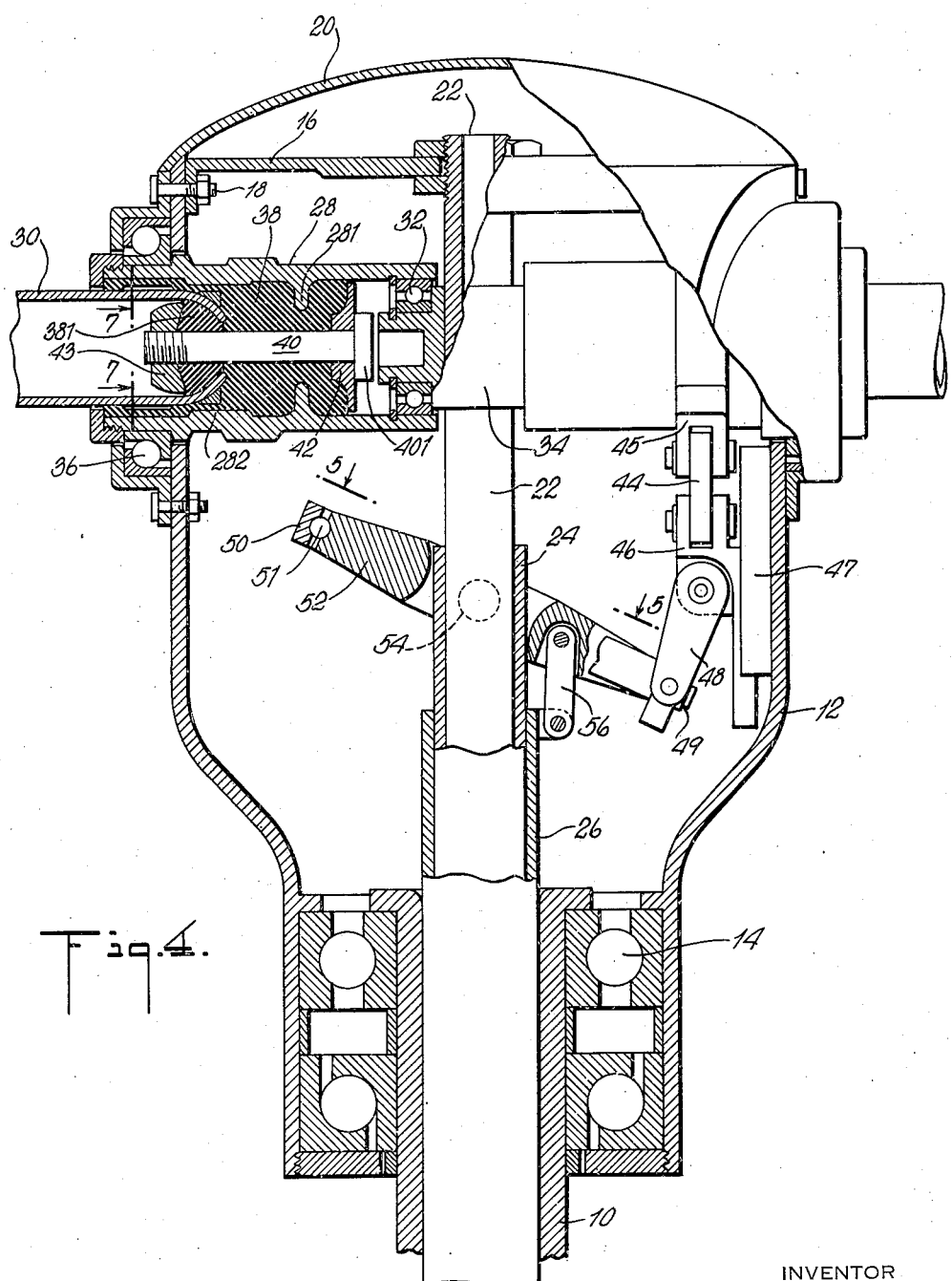
Fig. 4 is a view in vertical section and drawn to a larger scale of the rotor driving head shown in Fig. 3.

In the drawings the invention is shown in connection with a helicopter having a fuselage 1 attached to suitable floats 2 by struts 3 and having a pivotally mounted rudder 4. The helicopter also comprises a plurality of relatively angularly disposed rotors having oscillatable blades 6 carried by heads 8 rotatably mounted on support tubes 10 secured to the fuselage 1 and mounted so as to diverge upwardly in a transverse plane of the fuselage 1.

Each head 8 comprises a metal cylinder 12 having a reduced inner end portion journalled on roller bearings 14 mounted on the outer end of the support tube 10. At its outer end the cylinder 12 is attached to a disk 16 by bolts 18 and is provided with a cap 20. The disk 16 is fixed on a drive shaft 22 which extends through concentric tubes 24 and 26 mounted in the support tube 10, the tubes 24 and 26 being movable longitudinally with respect to each other as well as with respect to the support tube 10 and drive shaft 22 but are splined or otherwise secured so as to rotate simultaneously in the tube 10.

Equally spaced about the head 8 are a plurality of tubes 28 to which are fixed the inner ends 30 of the blades 6. The tubes 28 have their inner ends supported on bearings 32 carried by a bearing support 34 which surrounds the drive shaft 22 while the outer ends of the tubes 28 project through openings in the cylinder 12 and are supported in bearings 36 attached to the outer face of the cylinder 12. A rubber block 38 is secured in the tube 28 by an annular rib 281 and is held against rotation by ribs 282. The rubber block 38 is recessed at its outer end to receive the partially closed inner end of the tubular end 30 of the blade 6. The rubber block 38 has a portion 381 which is received in the tubular end 30 and the block 38 has an opening to receive a bolt 40 which holds the blade 6 in place and is secured in position by a head 401 which bears against a washer 42 at the inner end of the rubber block 38 and a nut 43 which bears against the portion 381 of the rubber block 38. To oscillate each tube 28 and the corresponding blade 6 a link 44 has one end pivotally connected to a yoke 45 attached to the tube 28 and its opposite end pivotally connected to a yoke forming part of a slide member 46 mounted for sliding movement in a guide member 47 attached to the inner face of the cylinder 12.

To the slide member 46 there is pivotally attached one end of a link 48 the other end of which is pivotally attached by means of a gimbal joint to a lug 49 on a ring 50. The ring 50 is mounted on suitable roller bearings 51 carried on the perimeter of a disk 52 having an opening to receive the drive shaft 22 and tube 24 and journaled on bearing members 54 secured to opposite sides of the tube 24. A link 56 is pivotally connected at one end to the disk 52 and at its opposite end is pivotally connected to the upper end of the tube 26.

The construction described is such that operation of the drive shaft 22 will rotate the disk 16 and the head 8 carrying with it the blades 6 and the ring 50. With the disk 52 inclined, rotation of the ring 50 about the disk 52 will cause oscillation of the blades 6 about the axis of the tubes 28. Any relative longitudinal movement of the tubes 24 and 26 will vary the extent of the oscillations of the blades 6 and rotation of the tubes 24 and 26 will change the points in the rotation of the blades 6 about the axis of the drive shaft 22 at which the maximum and minimum deflections of the blades 6 occur.

To operate the drive shafts 22 one of the shafts 22 is extended beyond the tubes 24 and 26 to a greater extent than the other shaft 22 and has its end suitably supported in a bearing 56 and provided with a gear 57 which meshes with a gear 58 on a drive shaft 59 connected through an over drive clutch 60 with a motor 61. The other shaft 22 ends adjacent the first shaft 22 and has its end suitably journalled in a bearing 62 and provided with a gear 64 which meshes with a gear 65 on the first shaft 22, the gearing connecting the shafts 22 being such that the shafts revolve in opposite directions.

The tubes 24 project below the tubes 26 and to their lower ends are attached members which surround the drive shaft 22 and are formed to provide a gear portion 66 and a circular rack portion 67. The gear portion 66 is provided with gear teeth extending axially of the tube 24 sufficiently to permit of the longitudinal movement of the tube 24 necessary for the control of the disk 52 with the teeth of gear portion 66 remaining meshed with the teeth of a rack 68 slidably mounted in the rack guide 69 and operated by a rod or other suitable connection to a rod 70. The rod 70 is slidably mounted in a pivotally mounted guide block 72 and is attached to a rack 74 engaged by a gear 75 on the lower end of a control lever 76. The rack 74 for operating the two tubes 24 engage opposite sides of the gear 74. The guide block 72 is mounted on pivot plate 77 adjustably supported from a suitable support 78. The control lever 76 is mounted as at 79, for limited universal pivotal movement and to its lower end has rigidly secured an arm 80 having a ball and socket connection with the upper end of link 82. The link 82 is slotted to receive a pin 84 fixed in a standard 85. A nut or collar 86 on the pin 84 limits the link 82 to pivotal or sliding movement in a single plane.

Owing to its connection with the link 82 the operation of the control lever 76 is such that movement either directly forward or directly back will operate both racks 74 simultaneously in the same direction an equal distance and the racks 68 will be correspondingly operated. If the lever 76 is moved to one side or the other the connection to the link 82 will cause rotation of the lever 76 and operation of the gear 75 to shift the racks 74 in opposite directions and provide a corresponding operation for the racks 68.

The rack portion 67 on tube 24 is provided with teeth which extend entirely around the rack portion so that this portion will remain meshed with its operating gear 87 throughout any rotation imparted to the tube 24 during operation of the tube 24 by the rack 68. The operating gears 87 for the two tubes 24 are meshed so as to operate simultaneously to move the tubes 24 longitudinally and the shaft 88 carrying one of the gears 87 is extended and provided with an arm 89 operable through suitable connections 90 by a bell crank operating lever 92.

The lower end of each tube 26 is formed with a rack portion 94 having teeth which extend around the tube 26 so as to remain meshed with its operating quadrant 95 throughout any rotation of the tube 26 with the tube 24. The quadrants 95 are pivotally mounted, as at 96 and are formed with arms having connections through links 97 with opposite ends of a bar 98 and thence through suitable connections 99 with an end of a lever 100. The lever 100 is pivotally mounted as at 101, and has its opposite end formed as a yoke and engaged by a collar 102 operated by a governor 104. The governor 104 is operated from a shaft 106 driven from the engine shaft 59 by suitable gearing 107 engaged with the shaft 59 beyond the over-drive clutch 60, the arrangement being such that the governor 104 is operated upon rotation of the blades 6 in the event the engine 61 is stopped inadvertently.

To operate the rudder 4, a bar 108 fixedly secured at its center to the rudder shaft has connections 109 secured to its ends and extending to corresponding ends of a bar 110 fixed to a shaft 111 operated by foot operated bar 112.

In the operation of the device, adjusting the lever 92 raises or lowers the tube 24 thus varying the position of the pivot point 54 for the disk 52 and varying the inclination of the disk and the extent to which the blades 6 are oscillated during their rotation while rotating the tube 24 by means of the control lever 76 rotates the disk 52 so as to vary the point during the rotation of the blades 6 at which these blades reach the limits of their oscillatory movements. Rotation of the disk 52 by the control lever 76 thus provides a means for varying the direction of movement of the helicopter. The governor 104 is designed to maintain the blades 6 at an inclination which will permit of a pre-determined speed of rotation of the blades and will shift tube 26 to shift the disk 52 and thus vary the inclination of the blades to permit this speed of rotation independently of the setting of the lever 92 or the position of lever 76. Governor 104 being driven by the drive shaft 59 beyond the over running clutch continues to control the inclination of the blades 6 in the event the motor 61 is inadvertently stopped.

What I claim is:

1. In a helicopter drive mechanism, a drive shaft, blades operated from said drive shaft, means supporting said blades for oscillation about the longitudinal axes of said blades, a movably mounted support tube surrounding said drive shaft and having diametrically projecting bearing members, a disk pivotally supported on said bearing members, means connecting said disk and blades, means providing a fulcrum for said disk, said fulcrum means being rotatable with said disk and tube, and means for operating said support tube for varying the degree and direction of the inclination of the plane of the disk.

2. In a helicopter drive mechanism, a drive shaft, blades operated from said drive shaft, means supporting said blades for oscillation about the longitudinal axes of said blades, a movably mounted support tube surrounding said drive shaft and having diametrically projecting bearing members, a disk pivotally supported by said bearing members, means connecting said disk and blades, a second tube surrounding said first tube and rotatable therewith, means connecting said second tube and disk and means for operating said first tube longitudinally to vary the degree of inclination of the plane of the disk.

3. In a helicopter drive mechanism, a drive shaft, blades operated from said drive shaft, means supporting said blades for oscillation about the longitudinal axes of said blades, a movably mounted support tube surrounding said drive shaft and having diametrically projecting bearing members, a disk pivotally supported by said bearing members, means connecting said disk and blades, a second tube surrounding said first tube and means for operating said second tube longitudinally to vary the degree of inclination of the plane of the disk.

4. In a helicopter drive mechanism, a drive shaft, blades operated from said drive shaft, means supporting said blades for oscillation about the longitudinal axes of said blades, a movably mounted support tube surrounding said drive shaft and having diametrically projecting bearing members, a disk pivotally supported by said bearing members, means connecting said disk and blades, a second tube surrounding said first tube and means for rotating said tubes to vary the direction of inclination of the plane of the disk.

5. In a helicopter drive mechanism, a drive shaft, blades operated from said drive shaft, means supporting said blades for oscillation about the longitudinal axes of said blades, a movably mounted support tube surrounding said drive shaft and having diametrically projecting bearing members, a disk pivotally supported on said bearing members and surrounding said tube, said tube being movable to vary the inclination of the plane of said disk with respect to said tube and shaft, a ring rotatable on the perimeter of said disk, means connecting said ring and said blades for oscillating said blades as said ring and blades rotate and means for operating said disk for varying the degree and direction of the inclination of the plane of the disk.

6. In a helicopter drive mechanism, a drive shaft, blades operated from said drive shaft, means supporting said blades for oscillation about the longitudinal axes of said blades, a movably mounted support tube surrounding said drive shaft and having diametrically projecting bearing members, a disk pivotally supported on said bearing members, means connecting said disk and blades for oscillating said blades upon rotation of said drive shaft and means for rotating said tube and disk for varying the point of maximum oscillation of said blades in the circle of rotation of said blades.

TOM H. THOMPSON.

REFERENCES CITED

The following references are of record in the file of this patent:

UNITED STATES PATENTS

| Number | Name | Date |
| --- | --- | --- |
| 1,096,045 | Mees | May 12, 1914 |
| 1,900,689 | Baum | Mar. 7, 1933 |
| 2,169,849 | Pitcairn | Aug. 18, 1939 |
| 2,193,498 | Stanley | Mar. 12, 1940 |
| 2,256,635 | Young | Sept. 23, 1941 |
| 2,256,918 | Young | Sept. 23, 1941 |
| 2,342,672 | Kinnucan | Feb. 29, 1944 |
| 2,376,523 | Synnestvedt | May 22, 1945 |
| 2,380,582 | Cierva | July 31, 1945 |
| 2,427,981 | Thompson | Sept. 23, 1947 |

OTHER REFERENCES

Ser. No. 254,867, Flettner (A. P. C.), pub. May 25, 1943.